W. H. BALDWIN.
DISH WASHER AND DRIER.
APPLICATION FILED MAY 8, 1915.

1,176,696.

Patented Mar. 21, 1916.

3 SHEETS—SHEET 1.

Witness
Adelaide Kearns

Inventor:
W. H. Baldwin,
By Robert W. Kandle
Attorney

Witness
Adelaide Kearns

Inventor:
W. H. Baldwin,
By Robert W. Faudle
Attorney.

W. H. BALDWIN.
DISH WASHER AND DRIER.
APPLICATION FILED MAY 8, 1915.

1,176,696.  Patented Mar. 21, 1916.
3 SHEETS—SHEET 3.

Witness
Adelaide Kearns

Inventor:
W. H. Baldwin,
By Robert N. Randle
Attorney.

UNITED STATES PATENT OFFICE.

WILLIAM H. BALDWIN, OF NEAR LYNN, RANDOLPH COUNTY, INDIANA.

DISH WASHER AND DRIER.

1,176,696.

Specification of Letters Patent. Patented Mar. 21, 1916.

Application filed May 3, 1915. Serial No. 26,693.

*To all whom it may concern:*

Be it known that I, WILLIAM H. BALDWIN, a citizen of the United States, and residing near Lynn, in Randolph county, in the State of Indiana, have invented a new and useful Construction for Dish Washers and Driers, of which the following is a full, clear, and comprehensive specification and exposition, the same being such as will enable others to make and use the same with exactitude.

The object of my invention, broadly speaking, is to provide a dish washer and drier which will be strong and durable in construction, adapted to be easily moved about from place to place over a floor, positive in its actions and adapted to obtain the desired results in a minimum amount of time and with a minimum amount of labor, easily operated and controlled, and which can be manufactured and sold at a comparatively low price.

More specifically stated, my object is to provide a dish washer and drier, adapted to contain a comparatively large number of dishes, having means for revolving the container, having means for directing an intense spray of hot water over, around, and among the dishes while they are in motion, means for causing said spray to have a high velocity, means for providing heat to raise the temperature of the water to the desired degree of heat, and having means for drying the dishes by centrifugal force.

Other minor objects and particular advantages of my invention will be brought out in the course of the following description, and that which is new will be correlated in the appended claims.

Various means may be employed for carrying out the details of construction, but that which I have found to give the best results under all conditions is shown in the accompanying drawings, in which—

Figure 1:
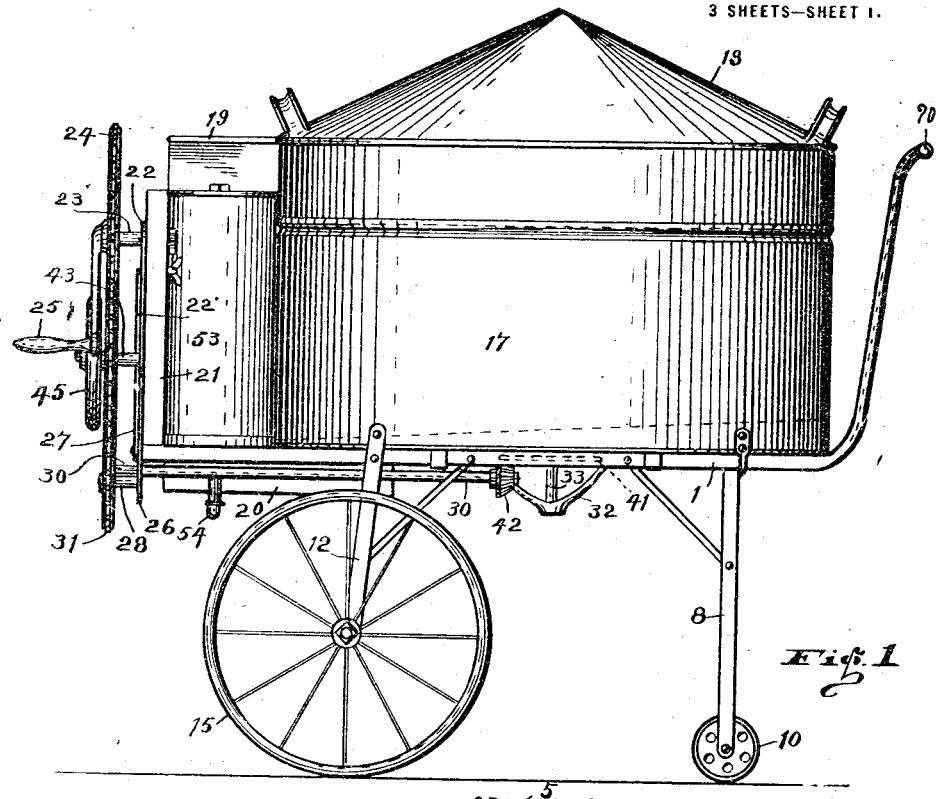
Figure 2:
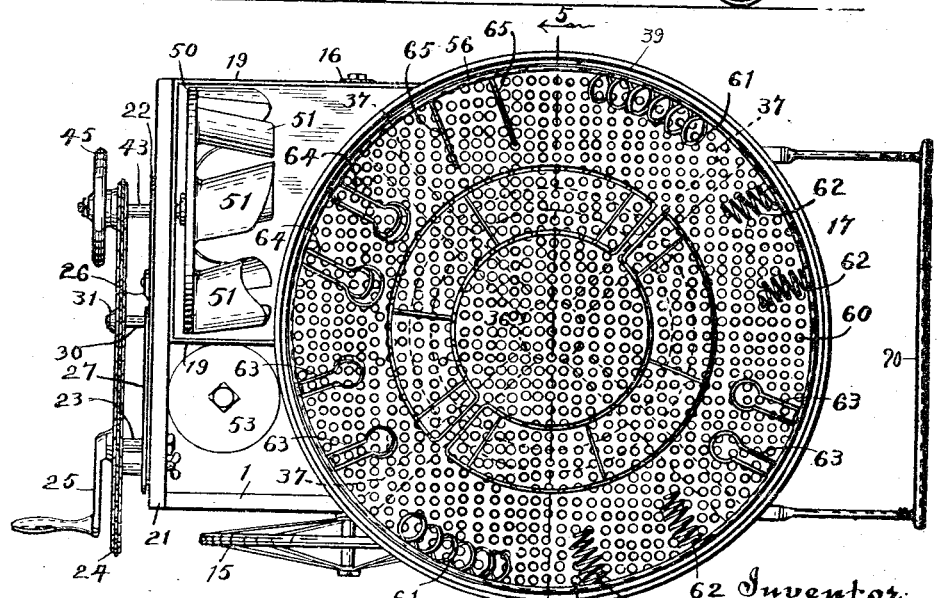
Figure 3:
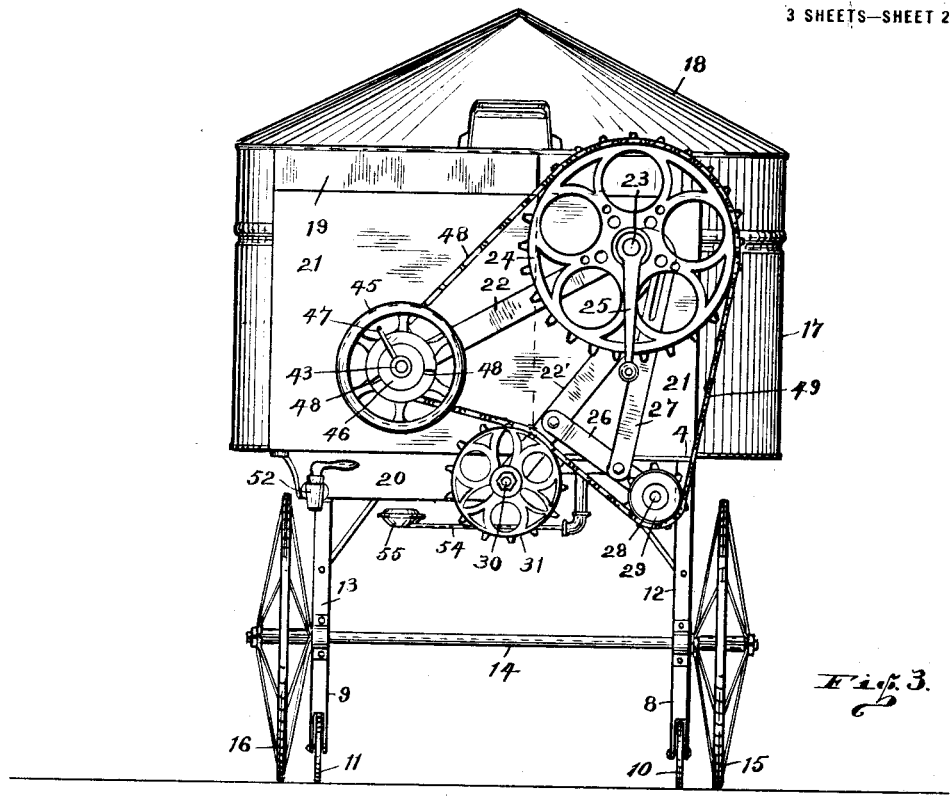
Figure 4:
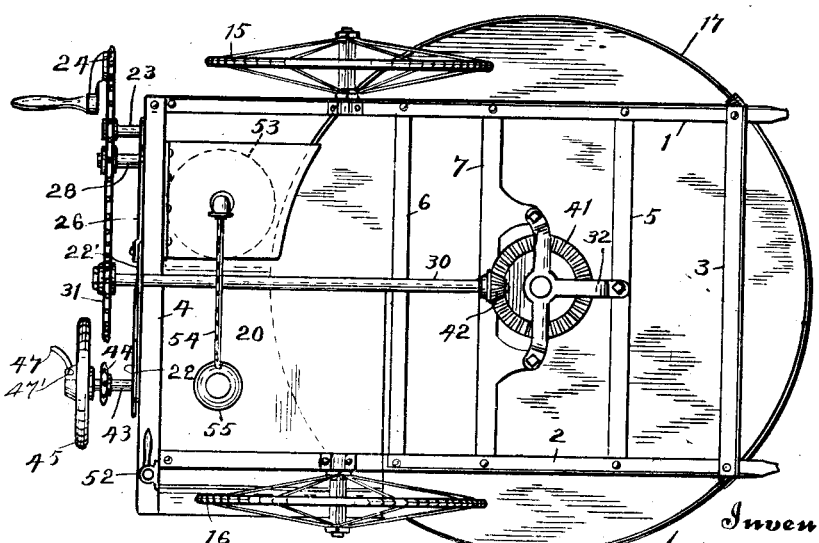
Figure 5:
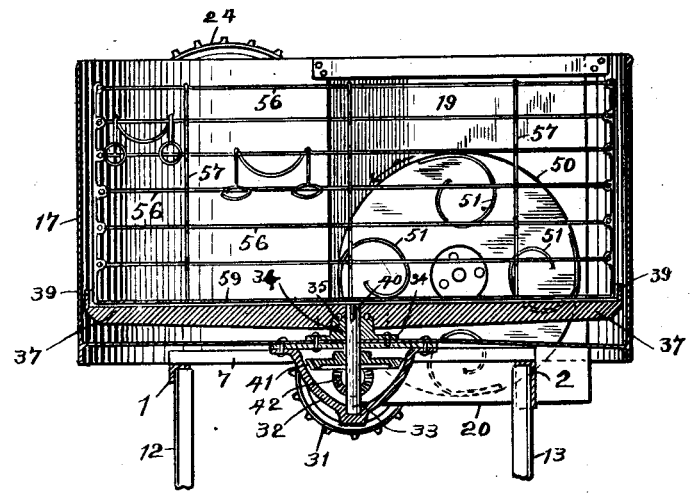
Figure 6:
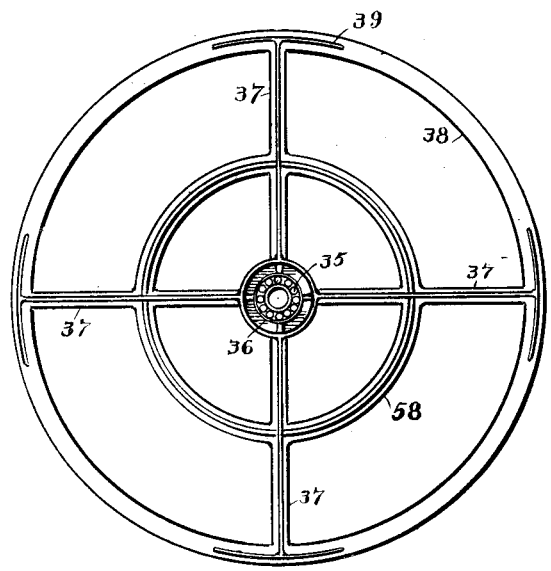
Figure 7:
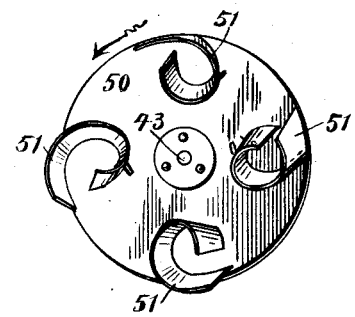

Figure 1 is a right-hand side elevation of the entire machine. Fig. 2 is a top plan view of the machine with the lid removed in order to show the interior of the machine. Fig. 3 is a rear elevation of the machine, showing the driving means and the means of operation. Fig. 4 is a bottom plan of the machine. Fig. 5 is a cross section of the body of the machine, the same being taken as on the line 5—5 of Fig. 2. Fig. 6 is a plan view of the horizontal carrying-wheel.
Fig. 7 is a front, or face, perspective view of the distributer for directing a spray or blast of water.

Similar indices denote like parts throughout the several views.

In order that the construction, the operation, and the advantages of my invention may be more thoroughly understood and appreciated I will now take up a detailed description thereof, in which I will set forth the invention as comprehensively as I may.

Referring now to the drawings in detail: The chassis or carrying frame comprises a frame made up of the side-bars 1 and 2, the end bars 3 and 4, and the intermediate cross-bars 5, 6 and 7, thereby forming the main frame. Extending down from the forward corners of said frame are the legs 8 and 9, to the lower ends of which are attached the respective rollers or casters 10 and 11. Extending down from the rear corners of the frame are the shorter legs 12 and 13, which carry the axle 14 on which is mounted the larger floor-wheels 15 and 16, respectively. Rigidly mounted on the frame is the container or tub 17, which is adapted to be covered by the lid 18.

Secured to the rear end of the tub, and to the left of the center thereof, is the extension 19 whose interior forms the distributer chamber; and a second extension projects down from the extension 19, forming a continuation thereof, with its bottom forming the bottom of the extension 19, and this second extension also extends into the tub, that is lowering a small portion of the bottom of the tub, thereby forming the well 20 into which the water from the tub is adapted to drain. Secured across the rear face of the extension 19, and projecting beyond to the right thereof, is the plate 21 to which the gear operating mechanisms are secured. Secured diagonally across the face of the plate 21 is the bar 22, whose upper part curves downward at the right-hand corner of said plate, and then extends downward and to the left, forming the arm 22′, the two parts: the bar 22 and the arm 22′ being integral with each other, thereby forming the two delta shaped, as shown. Secured near the upper right corner of the plate 21 and, extending through the curved portion of the bar 22, is the spindle 23 on which is revolubly mounted the driving sprocket 24, to which is attached the crank 25 by which the machine may be operated.

Pivoted near the central portion of the arm 22' and extending downward and to the right is the arm 26.

Numeral 27 denotes an adjusting arm which has its lower end pivoted to the arm 26, and its upper end is adjustably secured to the arm 22', as shown in Fig. 3. Carried by the lower extension of the arm 26 is the spindle 28, on which is mounted the idle sprocket 29. Mounted at its rear end in the lower end of the arm 22' is the shaft 30, on the rear end of which is secured the sprocket wheel 31, which is in alinement with the sprockets 24 and 29.

Secured to the cross-bars 5 and 7, and extending therebelow centrally of the container or tub 17, is the spider 32, in which is mounted the vertically disposed shaft 33, which extends up into and concentric of the container 17. Secured to the center of the bottom of the container, and located inside thereof, is the cone 34 through which passes the shaft 33, there being a race-way in the top of said cone for the balls 35.

The carrying wheel, shown in Fig. 6, comprises a central hub 36 which is adapted to fit down over the upper portion of the cone 34, as shown in Fig. 5, the same having a race-way therein in which may travel the said balls 35. Extending out horizontally from the said hub 36 are a plurality of spokes 37, the outer ends of which are connected by the rim 38, which has an upturned flange 39 extending therearound, for the purpose hereinafter stated. The said hub 36 is adapted to be secured to the upper end of the shaft 33 by a set-screw or wedge 40.

Secured to the shaft 33, below the bottom of the container, is the major bevel-gear 41, which meshes with the minor bevel gear 42, the latter being secured on the forward end of the shaft 30. Carried by the lower portion of the bar 22 is the stub shaft 43, on which is revolubly mounted the sprocket pinion 44. The latter being rigidly connected to the hand-wheel 45.

The hub 46 of the wheel 45 is provided with notches 48 which are adapted to receive the lever 47 pivotally connected as at 47' to the end of the shaft 43, but carried by the shaft so as to turn therewith. By swinging the lever 47 into one of the notches 48 the hand wheel 45 will be connected to the shaft 43 so as to turn therewith.

Numeral 49 denotes a sprocket chain which revolubly connects the sprocket 24, the idle sprocket 29, the sprocket 31, and the sprocket pinion 44, substantially as in Fig. 3.

Concentrically secured to the inner end of the shaft 43 is the hydraulic distributer, comprising the disk 50, on the face of which is carried a plurality of blade-like scrolls 51 which flare forward from the disk 50, and they are adapted, when revolved in the direction indicated by the arrow in Fig. 7, to dip up water from the well 20, carrying it upward and projecting it forward with great force into the container, the force depending somewhat on the speed at which the crank 25 is turned. The water from the container drains back into the well 20, from which latter it may be drawn through the faucet 52.

Located between the container 17 and the plate 21, to the right of the extension 19, is a fuel tank 53. Extending downward and to the left from said tank is a pipe 54 which leads to the burner 55, the latter being located below the well 20, and it provides means for heating the water contained in the machine.

The dish holding cage comprises a circular vertical wall made up of a plurality of wire rings 56, which are connected by the vertical bars 57. Secured to the lower ring 56 and to the lower ends of the bars 57 is the sheet metal bottom 59, which is provided with a multitude of perforations 60 formed therethrough, thereby making the bottom in the nature of a sieve. The cage thus formed is adapted to rest on the carrying wheel shown in Fig. 6, fitting inside the flange 39 and resting on the rim 38 and the bars 37. A further support may be provided for the cage by the ring 58 which connects the central portions of the spokes of the wheel, as shown in Fig. 6.

Numerals 61, 62, 63, 64 and 65 denote a plurality of removable and changeable wire brackets which are adapted to be hooked on the rings 56, and they may be distributed around inside the cage as desired, for the purpose of holding various kinds of dishes in spaced apart position and in such manner that they may be easily impinged by the blast or spray of water directed thereto.

Numeral 70 denotes the handle, by which the device may be propelled over a floor.

*Modus operandi.*—In practice the well should be filled with water, which may have been previously heated, or it may be heated by the burner 55 in the usual manner. The dishes to be washed are distributed around in the cage, suspending or otherwise supporting them by the various wire brackets. The lid is then placed in position, as in Fig. 1. Then by turning the crank 25 it is evident that the distributer will be revolved at a high rate of speed, sufficient to throw the water forward therefrom in an intense and penetrating spray, which will strike the dishes with such force as to remove all grease or other matter which has adhered thereto. If desired soap may be added to the water, which of course will accelerate the cleaning process. It is evident that the cage carrying the dishes will revolve continuously during all the time the distributer is in operation, thereby bringing all parts of each dish into direct contact with the spray from the distributer. After the dishes have been sufficiently washed then the lever 47 may be turned outward, thereby placing the distributer out of gear, and allowing it to remain stationary. Then by turning the crank with considerable speed the cage with the dishes therein will be revolved with such force as to cause the water to be thrown off from the dishes by centrifugal force assisted by the action of the air and the heat of the dishes, thereby drying them, after which the lid 18 may be removed and the dishes allowed to cool, or they may be immediately removed. The water from the well may then be drawn off, through the faucet 52, and the machine will then be ready to repeat the operations as set forth.

In removing the dishes it is evident that the entire cage holding the dishes may be lifted out and carried to the place desired, and if preferred a second cage, identical therewith, may have been filled with dishes and then placed in the machine immediately upon the removal of the first cage, thereby permitting the machine to be operated almost continuously.

I would also have it understood that the machine may be operated by an electric motor, or other power, in place of the crank to be operated by hand as shown, in which instance the floor wheels should be removed and the machine made stationary.

Having now fully shown and described my invention, what I claim and desire to secure by Letters Patent of the United States, is—

1. A dish washer and drier comprising a tank, a container revolubly mounted within the tank, a distributer for throwing water across said container, means for revolving said container and distributer and means whereby the container may be revolved independently of the distributer.

2. A dish washing and drying apparatus comprising a vertical tank, a container revolubly mounted therein, a well secured to one side of the tank having its lower portion projecting below the tank and the upper portion thereof communicating with the tank, a distributer revolubly mounted within the well, means operatively connecting the distributer and container for jointly revolving the same and means whereby the distributer may be disconnected from the container so that the latter may be revolved independently of the distributer.

3. In a dish washing and drying apparatus comprising a tank, a container revolubly mounted therein, means for operating said container, a well arranged at one side of the tank and communicating therewith, a shaft extending within said well, a distributer mounted upon said shaft whereby upon the rotation of the shaft the distributer will force the water contained within the well across said container, a hand wheel loosely mounted upon said shaft, a clutch for connecting said hand wheel with said shaft, means for operatively connecting said hand wheel with the container operating means whereby the distributer and container may be operated in unison when said clutch is connected to said shaft and the container being adapted to revolve independently of the distributer when said clutch has been released.

In testimony whereof I have hereunto subscribed my name to this specification in the presence of two subscribing witnesses.

WILLIAM H. BALDWIN.

Witnesses:
 ROBT. W. RANDLE,
 R. E. RANDLE.